United States Patent
Ma et al.

(10) Patent No.: US 9,970,069 B2
(45) Date of Patent: May 15, 2018

(54) SULFONATOCALIXARENE TANNING AGENT FOR LEATHER TANNING AND PREPARATION METHOD THEREFOR

(71) Applicant: SHAANXI UNIVERSITY OF SCIENCE & TECHNOLOGY, Xi'an (CN)

(72) Inventors: Jianzhong Ma, Xi'an (CN); Yongxiang Zhou, Xi'an (CN); Dangge Gao, Xi'an (CN); Panpan Zhang, Xi'an (CN); Bin Lv, Xi'an (CN)

(73) Assignee: SHAANXI UNIVERSITY OF SCIENCE & TECHNOLOGY, Xi'an (CN)

(*) Notice: Subject to any disclaimer, the term of this patent is extended or adjusted under 35 U.S.C. 154(b) by 0 days. days.

(21) Appl. No.: 15/322,219

(22) PCT Filed: Jun. 18, 2015

(86) PCT No.: PCT/CN2015/081759
§ 371 (c)(1),
(2) Date: Dec. 27, 2016

(87) PCT Pub. No.: WO2016/037508
PCT Pub. Date: Mar. 17, 2016

(65) Prior Publication Data
US 2017/0137903 A1 May 18, 2017

(30) Foreign Application Priority Data
Sep. 12, 2014 (CN) .......................... 2014 1 0464488

(51) Int. Cl.
*C14C 3/20* (2006.01)
*C08G 8/28* (2006.01)
*C08G 8/04* (2006.01)

(52) U.S. Cl.
CPC .................. *C14C 3/20* (2013.01); *C08G 8/28* (2013.01); *C08G 8/04* (2013.01)

(58) Field of Classification Search
CPC ................ C14C 3/20; C08G 8/28; C08G 8/04
See application file for complete search history.

(56) References Cited

PUBLICATIONS

Valand et all. Curcumin-p-sulfonatocalix[4]resorcinarene(p-SC[4]R) interaction: Thermo-Physico chemistry, Stability and biological evaluation The Royal Society of Chemistry, 2013.*
Basilio et al. Aggregation of p-sulfonatocaliarene-based amphiphiles and supra amphiphiles. Int. J. Mol. Sci. 2013, 14, 3140-3157.*
Weinelt et al. MEchanism of Macrocycle Genesis. The COndensation of Resorcinol with Aldehydes. J. Org. Chem. vol. 56. No. 19, 1991. 5527-5535.*

* cited by examiner

*Primary Examiner* — Amina S Khan
(74) *Attorney, Agent, or Firm* — CBM Patent Consulting, LLC

(57) ABSTRACT

A sulfonatocalixarene tanning agent for leather tanning and a preparation method comprises: using resorcinol and aldehyde monomers as raw materials for the tanning agent; adding an ethanol solution into the resorcinol, dropwise adding an inorganic strong acid catalyst and aldehyde derivatives, heating to react, cooling, carrying out suction filtration, repeatedly washing with ethanol and distilled water, and drying to obtain resorcinol calixarene; and weighing the resorcinol calixarene, and adding a sulfonating agent to react, thereby obtaining a sulfonatocalixarene tanning agent aqueous solution.

2 Claims, No Drawings

SULFONATOCALIXARENE TANNING AGENT FOR LEATHER TANNING AND PREPARATION METHOD THEREFOR

This application is the U.S. national phase of International Application No. PCT/CN2015/081759 Filed on 18 Jun. 2015 which designated the U.S. and claims priority to Chinese Application Nos. CN201410464488.3 filed on 12 Sep. 2014, the entire contents of each of which are hereby incorporated by reference.

TECHNICAL FIELD

The present invention relates to a tanning agent, in particular to a sulfonatocalixarene tanning agent for leather tanning and a preparation method thereof.

BACKGROUND ART

In order to reduce chromium emission, tinning workers have already developed many technologies and methods for relieving chromium pollution. To summarize, the methods are divided into two types: one is for dealing with waste chromium liquid and reducing the chromium content in the waste liquid; the other is for decreasing chromium usage by recycling chromium tanning liquid or increasing the absorptive rate of chromium. These conventional 'end-of-pipe control' methods are passive modes with large pollution control expense, high operation costs, and high control difficulty, and thus will not bring any economic benefits to enterprises. Therefore, the chromium pollution problem shall be solved from sources, and development of clean materials used for leather tanning and free of chromium tanning agents is a hotspot currently.

A calixarene is a cyclic oligomer prepared through the reaction between phenols or derivatives thereof and aldehydes and connection via a methylene group. The calixarene features high chemical stabilities, optimal thermal stabilities, and adjustable cavity sizes and simple synthesis. Function groups such as sulfonic acid group, amino, carboxyl, and acylamino may be introduced to the calixarene through derivatization. These groups connect with groups such as amino and carboxyl on the leather collagen fiber through electrovalent bonds or hydrogen bonds, producing a tanning effect on collagen fiber, and thus improving the chemical reagent resisting effect, humidity and heat resisting stability and the like of the collagen fiber. In addition, a phenolic hydroxyl group on the lower edge of the calixarene has coordination capability, can produce hydrogen bond combination with the amino, guanidyl and peptidyl in the collagen fiber and similarly plays a tanning effect on the collagen fiber. Calixarene-synthetic raw materials are non-toxic or lowtoxic, the synthesis process is simple and easy to operate, and a synthetic product is non-toxic; therefore it is feasible to use a sulfonatocalixarene as a chromium-free tanning agent for leather tanning. The sulfonatocalixarene tanning agent belongs to a novel non-toxic and environmentally friendly chromium-free tanning agent and features a decreased chromium usage amount, which reduces chromium pollution and achieves a clean leather tanning process.

TECHNICAL PROBLEM

An objective of the present invention is to provide a sulfonatocalixarene tanning agent for leather tanning and a preparation method thereof and to prepare a novel non-toxic and environmental-friendly chromium-free tanning agent.

SOLUTION FOR THE PROBLEM

Technical Solution

A sulfonatocalixarene tanning agent for leather tanning characterized by:
being prepared from the following components:
resorcinol calixarene 1 g and
sulfonating agent 3-5 mL,
wherein
the sulfonating agent is selected from sulfuric acid, fuming sulphuric acid and chlorosulfonic acid.

The resorcinol calixarene is prepared from the following substances:
resorcinol 5.5 g,
benzaldehyde 4.24-6.4 g or p-hydroxybenzaldehyde 5-7 g,
inorganic strong acid catalyst 7-13 mL, and
ethanol solution as a reaction solvent.

The inorganic strong acid catalyst is selected from the following components in percentages by mass: hydrochloric acid 37%, nitric acid 65% and sulfuric acid 98%; and
a ratio of absolute ethanol to water in the ethanol solution by volume is (1:5)-(5:1).

A preparation method for a sulfonatocalixarene tanning agent for leather tanning, characterized by
comprising the following steps:
step one, adding 5.5 g of resorcinol to a four-mouth flask, adding an ethanol solution while stirring at 200 r/min, and dropwise and slowly adding 7-13 mL of inorganic strong acid catalyst, and 4.24-6.4 g of benzaldehyde or 5-7 g of p-hydroxybenzaldehyde simultaneously by using two constant-pressure dropping funnels with an ice-water bath of 5° C. and under $N_2$ protection;
step two, after adding is finished, heating to a temperature of 60-80° C., and reacting for 6 hours;
step three, after the reaction is finished, cooling, performing suction filtration (namely, repeatedly washing with ethanol and distilled water during suction filtration so that the solid product changes gradually from dark green to yellow), drying the product in a vacuum oven at 80° C. after suction filtration is finished to obtain light yellow powder (namely, the prepared resorcinol calixarene); and
step four, weighing 3.0-5.0 g of the resorcinol calixarene, adding 9-25 mL of sulfonating agent such as sulfuric acid, fuming sulphuric acid or chlorosulfonic acid, and sulfonating at 70-80° C. for 2-4 hours to obtain an aqueous sulfonatocalixarene tanning agent solution.

In step 1, a ratio of absolute ethanol to water in the ethanol solution by volume is (1:5)-(5:1); and
the inorganic strong acid catalyst is selected from the following components in percentages by mass: hydrochloric acid 37%, nitric acid 65% and sulfuric acid 98%.

ADVANTAGEOUS EFFECTS OF THE INVENTION

Advantageous Effects

According to the present invention, resorcinol and an aldehyde monomer are used as raw materials to obtain a resorcinol calixarene through an one-step synthesis method. The preparation method is simple and practical, the reactants and product are low-toxi or non-toxic, and good water solubility of the resorcinol calixarene is achieved after sulfonation. Use of the sulfonatocalixarene tanning agent in leather tanning can improve hydrothermal stability of collagen fiber, increase the rawhide shrinkage temperature to 80° C., and play a tanning role on the collagen fiber. A physical and mechanical property test of tanned leather blanks shows that the tensile strength and tensile properties of the leather blanks are superior to those of conventional chromium tanning, the leather blanks are full and soft in hand feeling, and a thickness increase rate is obvious. Therefore, this patent indicates that the sulfonatocalixarene can replace tanning chromium powder for leather tanning, which decreases the chromium powder usage amount and reduces chromium pollution.

EXAMPLES OF THE INVENTION

Detailed Description of the Embodiments

Detailed description of the invention is given below with reference to the specific embodiments.

The invention relates to a sulfonatocalixarene tanning agent for leather tanning, which is prepared from the following components:

resorcinol calixarene 1 g (relating to calix [4] resorcine, calix [6] resorcine and calix [8] resorcine) and sulfonating agent 3-5 mL, wherein the sulfonating agent is selected from sulfuric acid, fuming sulphuric acid and chlorosulfonic acid.

The resorcinol calixarene is prepared from the following substances:

resorcinol 5.5 g, benzaldehyde 4.24-6.4 g or p-hydroxybenzaldehyde 5-7 g, inorganic strong acid catalyst 7-13 mL, and ethanol solution as a reaction solvent.

The inorganic strong acid catalyst is selected from the following components in percentages by mass: hydrochloric acid 37%, nitric acid 65% and sulfuric acid 98%; and a ratio of absolute ethanol to water in the ethanol solution by volume is (1:5)-(5:1).

A preparation method for the sulfonatocalixarene tanning agent for leather tanning comprises the following steps:

Step one, adding 5.5 g of resorcinol to a four-mouth flask, adding an ethanol solution while stirring at 200 r/min, and dropwise and slowly adding 7-13 mL of inorganic strong acid catalyst, and 4.24-6.4 g of benzaldehyde or 5-7 g of p-hydroxybenzaldehyde simultaneously by using two constant-pressure dropping funnels with an ice-water bath of 5° C. and under N2 protection.

A ratio of absolute ethanol to water in the ethanol solution by volume is (1:5)-(5:1).

The inorganic strong acid catalyst is selected from the following components in percentages by mass: hydrochloric acid 37%, nitric acid 65% and sulfuric acid 98%.

Step two, after adding is finished, heating to the temperature of 60-80° C., and reacting for 6 hours.

Step three, after the reaction is finished, cooling, performing suction filtration (namely, repeatedly washing with ethanol and distilled water during suction filtration so that the solid product changes gradually from dark green to yellow), drying the product in a vacuum oven at 80° C. after suction filtration is finished to obtain light yellow powder (namely, the prepared resorcinol calixarene).

Step four, weighing 3.0-5.0 g of the resorcinol calixarene, adding 9-25 mL of sulfonating agent such as sulfuric acid, fuming sulphuric acid or chlorosulfonic acid, and sulfonating at 70-80° C. for 2-4 hours to obtain an aqueous sulfonatocalixarene tanning agent solution.

Example 1

Step one: adding 5.5 g of resorcinol to a four-mouth flask, adding an ethanol solution while stirring at 200 r/min, and dropwise and slowly adding 7 mL of inorganic strong acid catalyst, and 6.4 g of benzaldehyde simultaneously by using two constant-pressure dropping funnels with an ice-water bath of 5° C. and under N2 protection.

A ratio of absolute ethanol to water in the ethanol solution by volume is 1:5.

The inorganic strong acid catalyst is 98% of sulfuric acid in percentage by mass.

Step two: after adding is finished, heating to the temperature of 60° C., and reacting for 6 hours.

Step three: after the reaction is finished, cooling, performing suction filtration (namely, repeatedly washing with ethanol and distilled water during suction filtration so that the solid product changes gradually from dark green to yellow), drying the product in a vacuum oven at 80° C. after suction filtration is finished to obtain light yellow powder (namely, the prepared resorcinol calixarene).

Step four: weighing 5.0 g of the resorcinol calixarene, adding 9 mL of sulfonating agent such as sulfuric acid, fuming sulphuric acid or chlorosulfonic acid, and sulfonating at 80° C. for 2 hours to obtain an aqueous sulfonatocalixarene tanning agent solution.

Example 2

Step one: adding 5.5 g of resorcinol to a four-mouth flask, adding an ethanol solution while stirring at 200 r/min, and dropwise and slowly adding 8 mL of inorganic strong acid catalyst, and 5.32 g of benzaldehyde simultaneously by using two constant-pressure dropping funnels with an ice-water bath of 5° C. and under N2 protection.

A ratio of absolute ethanol to water in the ethanol solution by volume is 1:1.

The inorganic strong acid catalyst is 65% of nitric acid in percentage by mass.

Step two: after adding is finished, heating to the temperature of 65° C., and reacting for 6 hours.

Step three: after the reaction is finished, cooling, performing suction filtration (namely, repeatedly washing with ethanol and distilled water during suction filtration so that the solid product changes gradually from dark green to yellow), drying the product in a vacuum oven at 80° C. after suction filtration is finished to obtain light yellow powder (namely, the prepared resorcinol calixarene).

Step four: weighing 4.5 g of the resorcinol calixarene, adding 12 mL of sulfonating agent such as sulfuric acid, fuming sulphuric acid or chlorosulfonic acid, and sulfonating at 78° C. for 2.5 hours to obtain an aqueous sulfonatocalixarene tanning agent solution.

Example 3

Step one: adding 5.5 g of resorcinol to a four-mouth flask, adding an ethanol solution while stirring at 200 r/min, and dropwise and slowly adding 9 mL of inorganic strong acid catalyst, and 4.24 g of benzaldehyde simultaneously by using two constant-pressure dropping funnels with an ice-water bath of 5° C. and under N2 protection.

A ratio of absolute ethanol to water in the ethanol solution by volume is 2:1;

The inorganic strong acid catalyst is 37% of hydrochloric acid in percentage by mass.

Step two: after adding is finished, heating to the temperature of 70° C., and reacting for 6 hours.

Step three: after the reaction is finished, cooling, performing suction filtration (namely, repeatedly washing with ethanol and distilled water during suction filtration so that the solid product changes gradually from dark green to yellow), drying the product in a vacuum oven at 80° C. after suction filtration is finished to obtain light yellow powder (namely, the prepared resorcinol calixarene).

Step four: weighing 4.0 g of the resorcinol calixarene, adding 15 mL of sulfonating agent such as sulfuric acid, fuming sulphuric acid or chlorosulfonic acid, and sulfonating at 76° C. for 3 hours to obtain an aqueous sulfonatocalixarene tanning agent solution.

Example 4

Step one: adding 5.5 g of resorcinol to a four-mouth flask, adding an ethanol solution while stirring at 200 r/min, and dropwise and slowly adding 11 mL of inorganic strong acid catalyst, and 7 g of p-hydroxybenzaldehyde simultaneously by using two constant-pressure dropping funnels with an ice-water bath of 5° C. and under N2 protection.

A ratio of absolute ethanol to water in the ethanol solution by volume is 3:1.

The inorganic strong acid catalyst is 98% of sulfuric acid in percentage by mass.

Step two: after adding is finished, heating to the temperature of 70° C., and reacting for 6 hours.

Step three: after the reaction is finished, cooling, performing suction filtration (namely, repeatedly washing with ethanol and distilled water during suction filtration so that the solid product changes gradually from dark green to yellow), drying the product in a vacuum oven at 80° C. after suction filtration is finished to obtain light yellow powder (namely, the prepared resorcinol calixarene).

Step four: weighing 3.5 g of the resorcinol calixarene, adding 18 mL of sulfonating agent such as sulfuric acid, fuming sulphuric acid or chlorosulfonic acid, and sulfonating at 74° C. for 3.5 hours to obtain an aqueous sulfonatocalixarene tanning agent solution.

Example 5

Step one: adding 5.5 g of resorcinol to a four-mouth flask, adding an ethanol solution while stirring at 200 r/min, and dropwise and slowly adding 12 mL of inorganic strong acid catalyst, and 6 g of p-hydroxybenzaldehyde simultaneously by using two constant-pressure dropping funnels with an ice-water bath of 5° C. and under N2 protection.

A ratio of absolute ethanol to water in the ethanol solution by volume is 4:1.

The inorganic strong acid catalyst is 65% of nitric acid in percentage by mass.

Step two: after adding is finished, heating to the temperature of 75° C., and reacting for 6 hours.

Step three: after the reaction is finished, cooling, performing suction filtration (namely, repeatedly washing with ethanol and distilled water during suction filtration so that the solid product changes gradually from dark green to yellow), drying the product in a vacuum oven at 80° C. after suction filtration is finished to obtain light yellow powder (namely, the prepared resorcinol calixarene).

Step four: weighing 3.0 g of the resorcinol calixarene, adding 21 mL of sulfonating agent such as sulfuric acid, fuming sulphuric acid or chlorosulfonic acid, and sulfonating at 72° C. for 4 hours to obtain an aqueous sulfonatocalixarene tanning agent solution.

Example 6

Step one: adding 5.5 g of resorcinol to a four-mouth flask, adding an ethanol solution while stirring at 200 r/min, and dropwise and slowly adding 13 mL of inorganic strong acid catalyst, and 5 g of p-hydroxybenzaldehyde simultaneously by using two constant-pressure dropping funnels with an ice-water bath of 5° C. and under N2 protection.

A ratio of absolute ethanol to water in the ethanol solution by volume is 5:1;

The inorganic strong acid catalyst is 37% of hydrochloric acid in percentage by mass.

Step two: after adding is finished, heating to the temperature of 80° C., and reacting for 6 hours.

Step three: after the reaction is finished, cooling, performing suction filtration (namely, repeatedly washing with ethanol and distilled water during suction filtration so that the solid product changes gradually from dark green to yellow), drying the product in a vacuum oven at 80° C. after suction filtration is finished to obtain light yellow powder (namely, the prepared resorcinol calixarene).

Step four: weighing 3.0 g of the resorcinol calixarene, adding 25 mL of sulfonating agent such as sulfuric acid, fuming sulphuric acid or chlorosulfonic acid, and sulfonating at 70° C. for 4 hours to obtain an aqueous sulfonatocalixarene tanning agent solution Contents of the invention are not limited to illustrated embodiments, and any equivalent alternatives made by a person of ordinary skill in the art by reading of the description of the invention shall be protected by the claims of the present invention.

What is claimed is:

1. A method for preparing a sulfonatocalixarene tanning agent for leather tanning comprising the following steps:
   step 1, adding 5.5 g of resorcinol to a four-mouth flask, adding an ethanol solution while stirring at 200 r/min, and dropwise and slowly adding 7-13 mL of an inorganic strong acid catalyst, and 4.24-6.4 g of benzaldehyde or 5-7 g of p-hydroxybenzaldehyde simultaneously by using two constant-pressure dropping funnels with an ice-water bath of 5° C. and under N2 protection;
   step 2 heating the solution of step 1 to the temperature between 60 and 80° C., and reacting for 6 hours;
   step 3 cooling the solution of step 2, filtering by suction while washing with ethanol and distilled water repeatedly until the color of solid product is changed from dark green to yellow, then drying the solid product in a vacuum oven at 80° C. that yields a light yellow powder which is resorcinol calixarene;
   and step 4, weighing 3.0-5.0 g of the resorcinol calixarene, adding 9-25 mL of sulfonating agent selected from the group consisting of sulfuric acid, fuming sulphuric acid and chlorosulfonic acid, and sulfonating at 70-80° C. for 2-4 hours to obtain the sulfonatocalixarene tanning agent.

2. The method according to claim 1, characterized in that in step 1, the, a ratio of absolute ethanol to water by volume is between 1:5 and 5:1; and the inorganic strong acid catalyst is selected from the group consisting of –37% of hydrochloric acid, 65% nitric acid and 98% of sulfuric acid by weight.

* * * * *